July 19, 1949.　　　R. SARAC　　　2,476,772
CLOTHESLINE REEL
Filed May 22, 1947
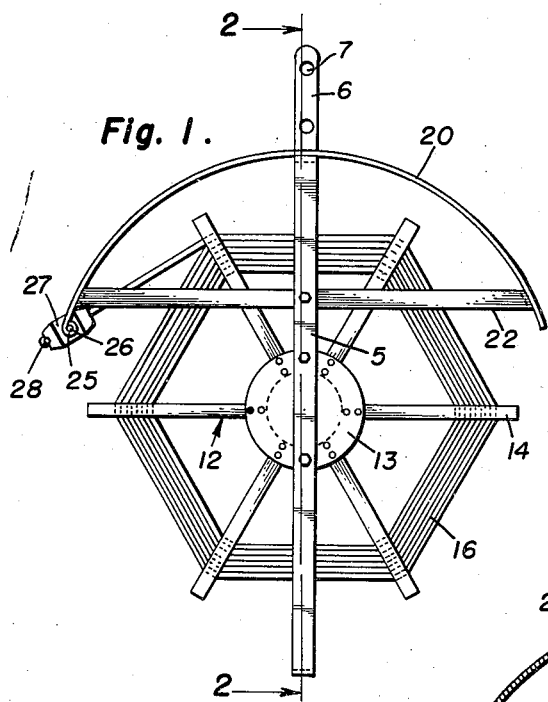
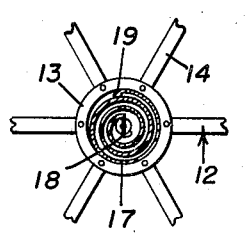
Fig. 1.　Fig. 4.　Fig. 3.
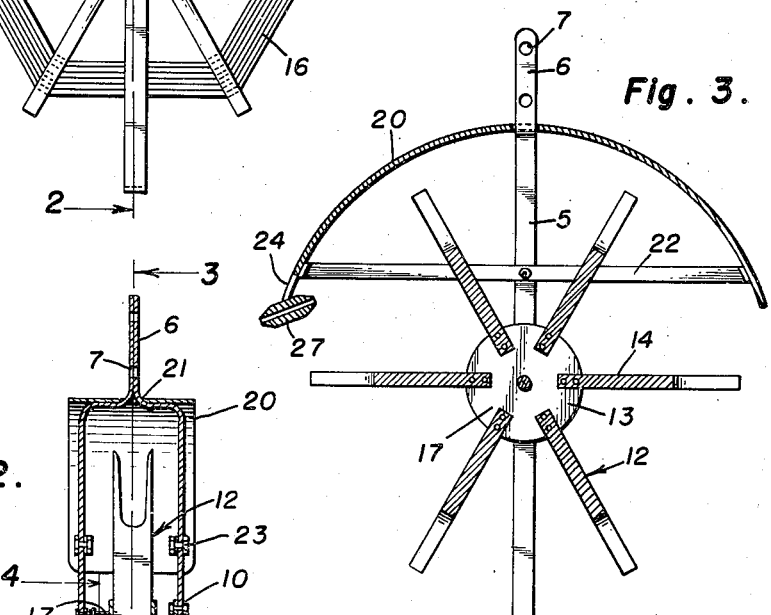
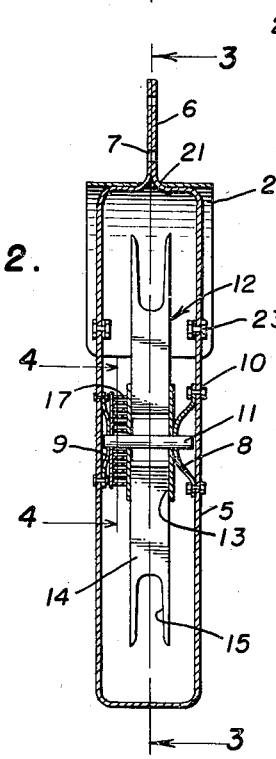
Fig. 2.
Inventor
Rade Sarac
By Clarence A. O'Brien
and Harvey B. Jacobson
Attorneys Patented July 19, 1949

2,476,772

UNITED STATES PATENT OFFICE 2,476,772

CLOTHESLINE REEL

Rade Sarac, Flint, Mich.

Application May 22, 1947, Serial No. 749,683

1 Claim. (Cl. 242—102)

1

The present invention relates to new and useful improvements in clothesline reels and more particularly to a spring reel for winding a clothesline thereon when the free end of the line is detached from a supporting structure.

An important object of the present invention is to provide a novel reel construction including a frame for rotatably supporting the reel and by means of which the reel may be attached to a supporting structure together with a cover for the reel and the line carried thereon to protect the line from the elements and from dust and dirt settling on the line, when not in use.

Another object of the invention is to provide a line guide pivotally carried at one end of the cover whereby to properly feed the line on the reel while winding the line thereon.

A further object of the invention is to provide a device of this character that is simple and practical in construction, which is strong and durable, efficient and reliable in use and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view;

Figure 2 is a vertical sectional view taken on the line 2—2 of Figure 1;

Figure 3 is a vertical sectional view taken on the line 3—3 of Figure 2; and

Figure 4 is a sectional view through the spring taken on the line 4—4 of Figure 2.

Referring now to the drawings in detail wherein for the purpose of illustration I have disclosed a preferred embodiment of the invention the numeral 5 designates a frame of substantially rectangular form and constructed of a single strip of strap metal, the ends of the strip of metal projecting upwardly from the frame in confronting relation to each other to provide a hanger 6 formed with openings 7 by means of which the frame may be attached to a suitable supporting structure. To the inner sides of the frame 5 are attached dome-shaped brackets 8 and 9 by means of bolts and nuts 10 or other suitable fastening devices, the central portion of the brackets 8 and 9 having a stationary shaft 11 supported therein.

A reel designated generally at 12 is composed of a pair of hub plates 13 and from which a plurality of spokes 14 project radially, the spokes

2 having a notch 15 in the outer end thereof and in which a clothesline 16 is received for winding the line on the reel.

A spiral leaf spring 17 has one end 18 secured to the shaft 11 and its other end 19 secured to an adjacent hub plate 13 of the reel, the spring being placed under tension whereby to exert its influence on the reel to rotate the same in a direction for winding the clothesline 16 thereon.

An arcuate sheet metal cover 20 is formed at its central portion with an opening 21 for receiving the hanger 6 whereby to support the cover on the upper portion of the frame 5.

A pair of spaced parallel braces 22 are connected at their ends to the end portions of the cover 20 and the central portion of the braces 22 are connected to the opposite sides of the frame 5 by bolts and nuts or the like 23 to rigidly hold the cover in position on the frame over the reel 12.

One end of the cover 20 is bifurcated as shown at 24 and is rolled to form eyes 25 in which a pin 26 is pivotally supported. The pin 26 projects outwardly at opposite sides of a tubular line guide 27 to pivotally support the line guide in the bifurcation 24 of the cover.

The free end of the line 16 is slidable in the line guide 27 and is provided with a cross pin or knot 28 to prevent pulling of the line through the guide when the line is wound on the reel as shown in Figure 1 of the drawings.

By attaching the hanger 6 to a suitable supporting structure the free end of the line 16 may be unwound from the reel and then attached to a remote supporting structure to provide a clothesline which is held taut by the spring 17. By releasing the free end of the line the same is then automatically wound on the reel.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

I claim:

A reel of the class described comprising a substantially rectangular frame, a hanger projecting upwardly from the top of the frame for attaching to a supporting structure, a spring reel journaled in the frame, an arcuate cover supported at the top of the frame above the reel, and having a bifurcated end rolled to provide bearings at the ends of the furcations, a tubular line guide having trunnions projecting therefrom and pivoted in said bearings, and horizontal bars rigidly connecting the ends of the cover to the frame.

RADE SARAC.

REFERENCES CITED

The following references are of record in the file of this patent:

UNITED STATES PATENTS

| Number | Name | Date |
|---|---|---|
| 524,167 | Fonda | Aug. 7, 1894 |
| 576,620 | Rowe | Feb. 9, 1897 |
| 599,771 | Devereaux | Mar. 1, 1898 |
| 777,926 | Stevens | Dec. 20, 1904 |
| 782,478 | Yeager | Feb. 14, 1905 |
| 1,000,045 | Spicer | Aug. 8, 1911 |
| 1,676,696 | Kanawyer | July 10, 1928 |
| 1,748,283 | Filby | Feb. 25, 1930 |
| 2,360,802 | Stenz | Oct. 17, 1944 |